Aug. 11, 1959     E. G. BOEHM     2,898,777

TORSIONAL VIBRATION DAMPER

Filed Nov. 29, 1957

*Inventor*
Eric G. Boehm

*Attys*

United States Patent Office 2,898,777
Patented Aug. 11, 1959

2,898,777
TORSIONAL VIBRATION DAMPER

Eric G. Boehm, Orchard Park, N.Y., assignor to Houdaille Industries, Inc., Buffalo, N.Y., a corporation of Michigan Application November 29, 1957, Serial No. 699,834

8 Claims. (Cl. 74—574)

The present invention relates to improvements in torsional vibration dampers, and more specifically to such a device, the natural frequency of which may be adjusted or varied.

Although the principles of the present invention may be included in various torsional dampers, a particularly useful application is made in torsional dampers of the type which may be secured to any one of various rotating elements. In particular, when rotating elements which are subjected to a torsional vibration are to be provided with means for suppressing or damping said vibration, there is a strong likelihood that the amount of such torsional vibration cannot be predicted accurately in advance. Accordingly, if torsional dampers be used which have a fixed resonant period designed into them, nothing can be done to more closely tune or adapt the damper to the problem.

However, in accordance with the principles of the present invention, means are provided wherein the natural frequency or resonant frequency of the damper may be adjusted or varied. Thus by the use of this invention, a given damper may be adjusted or varied to have a natural frequency for damping the vibrations in the rotational element, which natural frequency is based on conditions as they actually exist in the rotational element, rather than being based on a prediction of such conditions. It can be seen that a more accurate result can be obtained. Furthermore, when a torsional damper is utilized in accordance with the instant invention, any one unit, being adjustable, may be used in a different installation, wherein different natural frequencies are required of the damper. Thus a somewhat more versatile unit is produced than has been heretofore available.

Accordingly, it is an object of the present invention to provide an adjustable damper for torsional vibration.

Another object of the present invention is to provide a novel dynamic vibration absorber or damper including an adjustably tuned rubber coupling element, having novel interconnecting structure between the rubber element and the associated parts of the assembly.

Yet another object of the present invention is to provide a torsional damper where the angular deflection rate may be adjusted.

A still further object of the instant invention is to provide a torsional damper wherein the effective angular inertia and stroke or deflection rate may be varied.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

Figure 1:
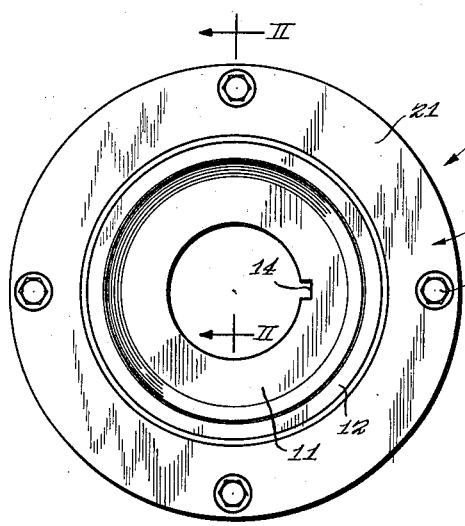
Figure 1 is a side elevational view of a damper unit according to the present invention.
Figure 4:
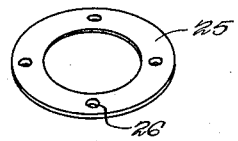
Figure 4 is a perspective view of a shim used in the structure according to Figure 2.
Figure 5:
Figure 5 is a perspective view of another shim which may be substituted for the shim of Figure 4.
Figure 2:
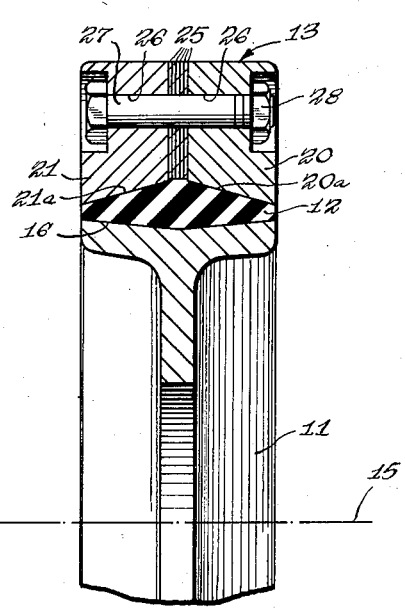
Figure 2 is an enlarged sectional view along line II—II of Figure 1.

The principles of this invention are particularly useful when embodied in a torsional vibration damper assembly such as illustrated in Figure 1, generally indicated by the numeral 10. The damper assembly includes a supporting member 11, an annular rubber member 12, and an adjustable inertia member generally indicated at 13.

The damper 10 may be mounted on a torsionally excited rotary element, about its rotational axis, by means of the supporting member 11. The supporting member 11 is preferably rigidly corotatably mounted to such rotary element, in any convenient manner. By way of example, a key slot 14 for receiving a locking key may be provided as shown in Figure 1. It is to be understood, however, that other means may be provided to secure the supporting member 11 to the torsionally excited rotary element, the vibration of which is to be suppressed. Such modes of attachment include, by way of example, bolting, a non-circular aperture with a corresponding shaft, splines, riveting, and the like. It is also to be understood that the supporting member 11 may be made integral with the excited rotary element, the rotional axis of which is indicated by the line 15.

Preferably, the supporting member 11 is provided with a radially outwardly directed surface 16 of a generally concave radial section. The principal function of the concavity of this surface is to prevent axial displacement between the rubber element 12 and the support 11. Accordingly, the term "concave" as used herein includes all structures which effect this result, such as, but not limited to, channeling and angling.

Figure 3:
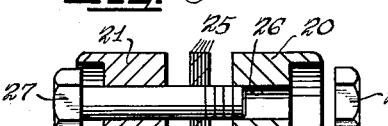
Figure 3 is a fragmentary sectional view of one of the elements shown in Figure 2.
Figure 6:
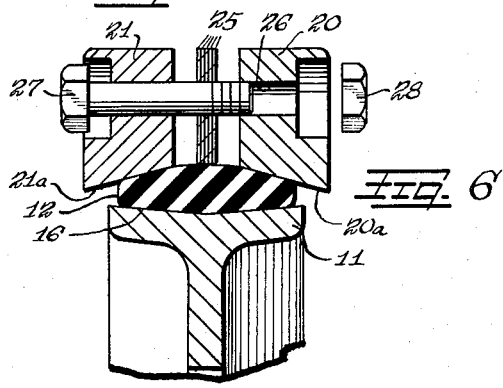
Figure 6 is generally similar to Figure 5, showing the assembly and disassembly of the adjusting means.

The annular rubber member 12 is preferably removable from the support member 11, whereby various elements or members 12 may be selected for their individual properties, such as angular "spring" deflection rate. The radial sectional shape of this member is not critical, the instant embodiment being illustrated in Figure 3 in its free state. When radially expanded or stretched, the element 12 takes a shape such as shown in Figure 6.

It is to be understood that the member 12 may comprise various rubber means, and in the broadest aspects of the instant invention, need not be annular. The term "rubber" as used herein, is intended to include natural rubber, synthetic rubber, and plastic materials having suitable physical properties such as elasticity and resiliency.

The inertial member 13 includes a pair of annular inertia members 20 and 21 which are concentrically disposed with respect to the rotational axis 15 and which surround the rubber element 12. The members 21 and 20 respectively have an angular or wedge surface 21a and 20a which jointly define a radially inwardly directed surface of a generally concave radial section. As in the instance of the surface 16, the term "concave" is intended to embrace angularly related lines as shown. The surface 20a, 21a, and the surface 16 jointly define a wedge-shaped cavity within which the rubber member 12 is disposed.

The inertia members 20 and 21 are axially adjustable with respect to each other. Means are provided with the members 20 and 21 to effect such adjustment, namely to draw them together. In the instant embodiment, a selectable number of shims 25 are disposed intermediate the inertia members 20 and 21. The shims 25 and the inertia members 20 and 21 are each provided with aligned apertures 26 through which extends means for drawing the apertured elements together. In this embodiment, this means includes a bolt 27 and a nut 28. Of course, a plurality of such means are provided as shown in Figure 1.

When the vibration damper has been installed, or is to be installed, the proper number of shims is selected, either by experience or by experimentation, to suit a given condition. The nut 28 is tightly secured on the bolt 27, whereby the inertia members 20 and 21 are drawn together against the shims 25. When these inertia members are so drawn together, the concave surface or wedges 20a and 21a effect a compression or plastic cold flow of the rubber member. Thus the rubber member is clamped by the concave surface 20a, 21a.

Since the rubber member 12 is stretched in the first instance, there is a natural tendency for it not to slip with respect to the surface 16. However, the clamping of the means 27, 28 increases the force which precludes slippage at the surface 16, and provides a similar force at the surface 20a, 21a.

It is to be understood that the number of shims 25 may be varied at will to produce the desired amount of damping from the unit. When a shim is added, two results are obtained. The first of these is that less compression of the rubber member 12 is produced, whereby its angular deflection rate is decreased. The second of these is that additional mass is provided for the inertia member 13. Each of these factors serves to lower the natural or resonant frequency of the damper unit 10. Conversely, shims may be removed to increase or raise the natural frequency of the unit 10.

In the event that this increment of change is too great, a number of annular shims 30 may be utilized in place of one of the shims 25, the number corresponding to the number of apertures 26 formed therein, or being any evenly balanced number. Thus if there are six apertures 26, three equally spaced shims 30 may be used in place of one shim 25. Thus substitutions between the two types of shims illustrated produce changes in mass of the inertial member 13 without changing the deflection rate or compression of the rubber member 12.

The term "deflection rate" as used herein refers to the resilient angular deflection or yielding of the assembled rubber element 12 as a function of torque applied between the members 11 and 13.

Although various modifications might be suggested by those versed in the art, it should be understood that I wish to embody within the scope of the patent warranted hereon all such embodiments as reasonably and properly come within the scope of my contribution to the art.

I claim as my invention:

1. A vibration damper for a torsionally excited rotary element comprising, in combination: a supporting member adapted for concentric attachment about the rotational axis of the rotary element, said member having a radially outwardly directed surface of a generally concave radial section; a pair of rigid annular inertia members disposed outwardly of and concentrically with said outwardly directed surface, said members being axially adjacent to each other and jointly having a radially inwardly directed camming surface of a generally concave radial section radially adjacent to said outwardly directed surface; and an annular rubber member disposed intermediate said surfaces for radial compression thereby; said pair of inertia members being axially adjustable with respect to each other to vary the angular deflection rate of said rubber member, thereby varying the natural frequency of the damper.

2. A vibration damper for a torsionally excited rotary element comprising, in combination: a supporting member adapted for concentric attachment about the rotational axis of the rotary element, said member having a radially outwardly directed surface of a generally concave radial section; a pair of rigid annular inertia members disposed outwardly of and concentrically with said outwardly directed surface, said members being axially adjacent to each other and jointly having a radially inwardly directed camming surface of a generally concave radial section radially adjacent to said outwardly directed surface; an annular rubber member disposed intermediate said surfaces for radial compression thereby; and means for axially adjusting said pair of inertia members with respect to each other whereby said surfaces may vary the compression of said rubber member, thereby varying the resonant frequency of the damper.

3. A vibration damper for a torsionally excited rotary element comprising, in combination: a supporting member adapted for concentric attachment about the rotational axis of the rotary element, said member having a radially outwardly directed surface of a generally concave radial section; a pair of rigid annular inertia members disposed outwardly of and concentrically with said outwardly directed surface, said members being axially adjacent to each other and jointly having a radially inwardly directed camming surface of a generally concave radial section radially adjacent to said outwardly directed surface; an annular rubber member disposed intermediate said surfaces for radial compression thereby; a selectable number of shims removably disposed intermediate said inertia members; and means for axially drawing said pair of inertia members together against said shims to compress said rubber member to an extent determined by said number of shims.

4. A vibration damper for a torsionally excited rotary element comprising, in combination: a supporting member adapted for concentric attachment about the rotational axis of the rotary element, said member having a radially outwardly directed surface of a generally concave radial section; a pair of rigid annular inertia members disposed outwardly of and concentrically with said outwardly directed surface, said members being axially adjacent to each other and jointly having a radially inwardly directed camming surface of a generally concave radial section radially adjacent to said outwardly directed surface; an annular rubber member disposed intermediate said surfaces for radial compression thereby; a selectable number of shims removably disposed intermediate said inertia members; said shims and said inertia members having aligned apertures; and adjustable means extending through said apertures for axially drawing said pair of inertia members together against said shims to compress said rubber member to an extent determined by said number of shims.

5. A vibration damper for a torsionally excited rotary element comprising, in combination: rigid annular inertia means disposed radially outward of the element and concentrically with the rotational axis of the rotational element; rubber means disposed intermediate said inertia means and the rotary element and radially compressed thereby; and means for selectably adjusting the amount said rubber means is compressed to thereby vary the natural frequency of the damper.

6. A vibration damper for a torsionally excited rotary element comprising, in combination: a radially outwardly directed supporting surface corotatably disposed on the rotary element; a pair of rigid annular inertia members disposed outwardly of and concentrically with said outwardly directed surface, said members being axially adjacent to each other and jointly having a radially inwardly directed camming surface of a generally concave radial section radially adjacent to said outwardly directed surface; and an annular rubber member disposed intermediate said surfaces for radial compression thereby; said pair of inertia members being axially adjustable with respect to each other to vary the angular deflection rate of said rubber member, thereby varying the natural frequency of the damper.

7. A vibration damper for a torsionally excited rotary element comprising, in combination: rigid annular inertia means disposed radially outward of the element and concentrically with the rotational axis of the element, said means including a pair of rigid annular members; rubber means disposed intermediate said annular members and the rotary element, and radially compressed thereby to preclude relative angular slippage between the element and said members; and a selectable number of shims removably disposed intermediate said annular members for varying the effective mass of said inertia means.

8. A vibration damper for a torsionally excited rotary element comprising, in combination: rigid annular inertia means disposed radially outward of the element and concentrically with the rotational axis of the element, said means including a pair of rigid annular members defining a wedge-shaped cavity with the element; rubber means compressively disposed in said wedge-shaped cavity and radially compressed by said annular members; and a selectable number of shims removably disposed intermediate said annular members for adjusting the amount said rubber means is compressed and for varying the effective mass of said inertia means.

References Cited in the file of this patent

UNITED STATES PATENTS

| | | |
|---|---|---|
| 2,477,081 | Peirce | July 26, 1949 |
| 2,779,210 | Holloway | Jan. 29, 1957 |
| 2,779,211 | Henrich | Jan. 29, 1957 |